United States Patent
Chakravarty et al.

(10) Patent No.: US 11,138,452 B2
(45) Date of Patent: Oct. 5, 2021

(54) VEHICLE NEURAL NETWORK TRAINING

(71) Applicant: Ford Global Technologies, LLC, Dearborn, MI (US)

(72) Inventors: Punarjay Chakravarty, Campbell, CA (US); Praveen Narayanan, San Jose, CA (US); Nikita Jaipuria, Union City, CA (US); Gaurav Pandey, College Station, TX (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 62 days.

(21) Appl. No.: 16/595,849

(22) Filed: Oct. 8, 2019

(65) Prior Publication Data

US 2021/0103745 A1  Apr. 8, 2021

(51) Int. Cl.
*G06K 9/00* (2006.01)
*G06T 7/73* (2017.01)

(52) U.S. Cl.
CPC ..... *G06K 9/00825* (2013.01); *G06K 9/00369* (2013.01); *G06T 7/74* (2017.01)

(58) Field of Classification Search
None
See application file for complete search history.

(56) References Cited

U.S. PATENT DOCUMENTS

| | | | |
|---|---|---|---|
| 6,094,215 A | 7/2000 | Sundahl et al. | |
| 8,106,924 B2 | 1/2012 | Aliprandi et al. | |
| 9,237,330 B2 | 1/2016 | Wang et al. | |
| 2014/0285623 A1 | 9/2014 | Brules | |
| 2019/0147582 A1* | 5/2019 | Lee | G06T 11/00 382/156 |
| 2019/0325597 A1* | 10/2019 | Chakravarty | H04N 13/239 |
| 2021/0004976 A1* | 1/2021 | Guizilini | G06T 7/521 |

* cited by examiner

*Primary Examiner* — Leon Flores
(74) *Attorney, Agent, or Firm* — Frank A. MacKenzie; Bejin Bieneman PLC

(57) ABSTRACT

A computer, including a processor and a memory, the memory including instructions to be executed by the processor to generate two or more stereo pairs of synthetic images and generate two or more stereo pairs of real images based on the two or more stereo pairs of synthetic images using a generative adversarial network (GAN), wherein the GAN is trained using a six-axis degree of freedom (DoF) pose determined based on the two or more pairs of real images. The instructions can further include instructions to train a deep neural network based on a sequence of real images and operate a vehicle using the deep neural network to process a sequence of video images acquired by a vehicle sensor.

20 Claims, 6 Drawing Sheets

VEHICLE NEURAL NETWORK TRAINING

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Figure 1:
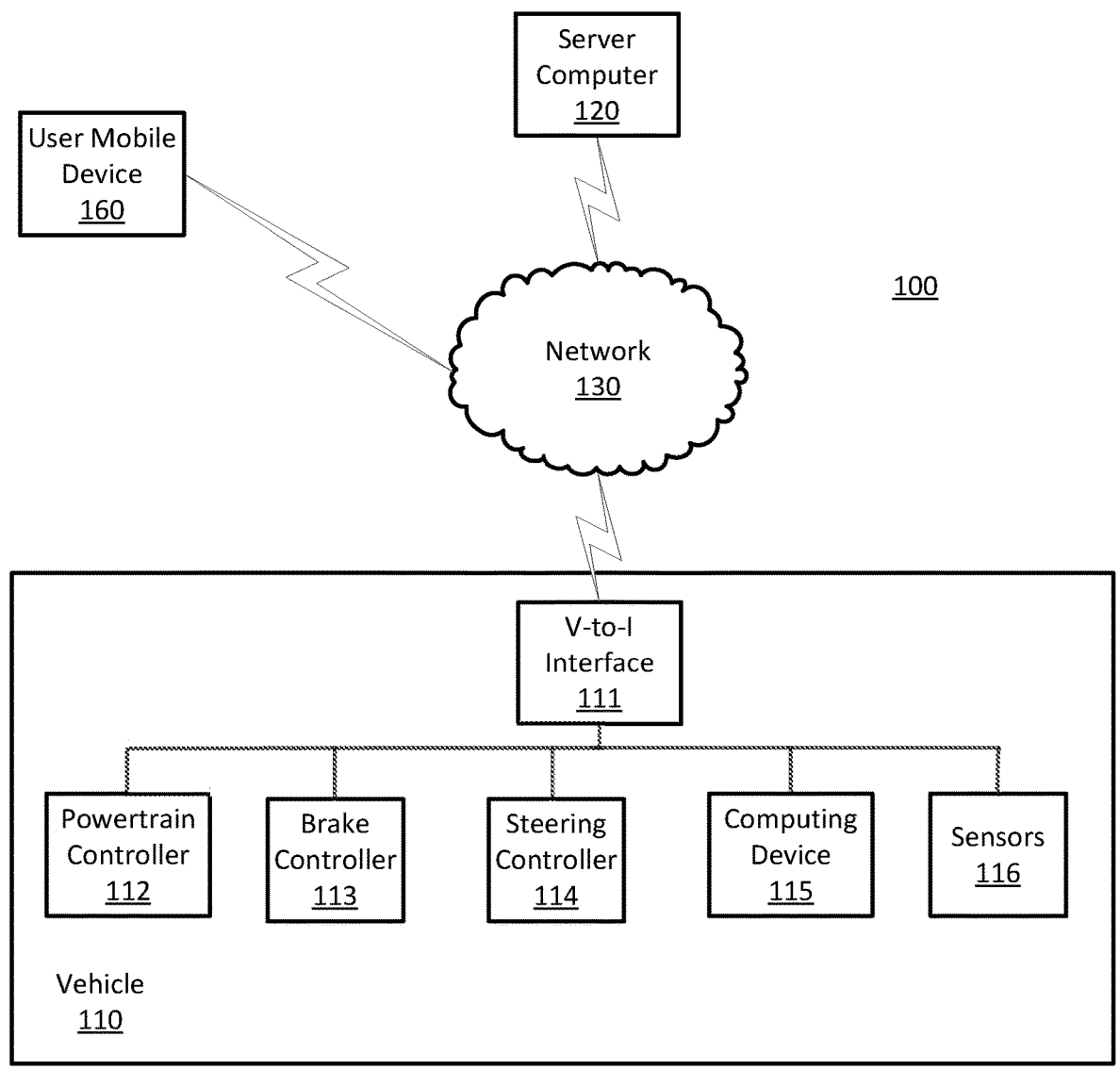
FIG. 1 is a diagram of an example traffic infrastructure system.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of a vehicle and to use the data to determine a vehicle path upon which to operate a vehicle in autonomous or semi-autonomous mode. A vehicle can operate on a roadway based on a vehicle path by determining commands to direct the vehicle's powertrain, braking, and steering components to operate the vehicle to travel along the path. The data regarding the external environment can include the location of one or more moving objects such as vehicles and pedestrians, etc., in an environment around a vehicle and can be used by a computing device in the vehicle to operate the vehicle.

A deep neural network (DNN) can be trained to operate vehicles by training the DNN using large numbers (>1000) of sample video images that include traffic scenes likely to be encountered by a vehicle while operating on a roadway. The more similarity between the sample video images and real video images acquired by vehicle sensors while operating on a roadway, the more likely the DNN is to provide useful data to the vehicle. To provide large numbers of sample video images that correspond to the large variety of lighting and weather conditions likely to be encountered by vehicles on roadways, synthetic images can be generated by a synthetic image rendering software and processed using generative adversarial networks to modify the synthetic images to appear to be photorealistic images. A photorealistic image is defined as an image that appears to a human observer as if it had been acquired by a real world video or image camera viewing a real world scene. An example of synthetic image rendering software is Unreal Engine, produced by Epic Games, Cary, N.C. 27581.

Disclosed herein is method including generating two or more stereo pairs of synthetic images and generating two or more stereo pairs of real images based on the two or more stereo pairs of synthetic images using a generative adversarial network (GAN), wherein the GAN is trained using a six-axis degree of freedom (DoF) pose determined based on the two or more pairs of real images. A deep neural network can be trained based on a sequence of real images and a vehicle can be operated using the deep neural network to process a sequence of video images acquired by a vehicle sensor. The GAN can be initially trained to generate stereo pairs of real images based on unpaired real and simulated images. Two or more pairs of synthetic images can be generated by inputting scene descriptions into a synthetic image rendering engine. The six-axis DoF pose of the two or more stereo pairs of synthetic images and the two or more pairs of real images can be generated by stereo visual odometery. Pose loss can be generated by determining a change in six-axis DoF pose for the two or more stereo pairs of synthetic images and the two or more pairs of real images. A six-axis DoF pose can be determined based on minimizing x, y, and z translations and roll, pitch, and yaw rotations for each of the two or more pairs of synthetic images and the two or more pairs of real images.

Pose loss can be determined by comparing the six-axis DoF for the two or more pairs of synthetic images and the six-axis DoF for the two or more real images. The GAN can be trained based on a loss functions that input ground truth based on three-dimensional pose loss determined for two or more pairs of synthetic stereo images, wherein three-dimensional pose loss is determined by comparing stereo reconstructions of the two or more pairs of synthetic stereo images. Training the GAN can be based on the loss function provides temporal consistency in the real images. The deep neural network can be trained to identify and locate objects in a sequence of video images including one or more of vehicles, pedestrians and roadways. The deep neural network can be trained based on ground truth determined by a scene description input to a synthetic rendering engine. A sequence of video images acquired by a video sensor can be processed to identify and locate one or more of vehicles, pedestrians, and roadways using a deep neural network. The vehicle can be operated by determining a vehicle path to locate the vehicle with respect to the roadway and avoid one or more of vehicle and pedestrians. The vehicle can be operated by controlling one or more of vehicle powertrain, vehicle steering, and vehicle brakes.

Further disclosed is a computer readable medium, storing program instructions for executing some or all of the above method steps. Further disclosed is a computer programmed for executing some or all of the above method steps, including a computer apparatus, programmed to generate two or more stereo pairs of synthetic images and generate two or more stereo pairs of real images based on the two or more stereo pairs of synthetic images using a generative adversarial network (GAN), wherein the GAN is trained using a six-axis degree of freedom (DoF) pose determined based on the two or more pairs of real images. A deep neural network can be trained based on a sequence of real images and a vehicle can be operated using the deep neural network to process a sequence of video images acquired by a vehicle sensor. The GAN can be initially trained to generate stereo pairs of real images based on unpaired real and simulated images. Two or more pairs of synthetic images can be generated by inputting scene descriptions into a synthetic image rendering engine. The six-axis DoF pose of the two or more stereo pairs of synthetic images and the two or more pairs of real images can be generated by stereo visual odometery. Pose loss can be generated by determining a change in six-axis DoF pose for the two or more stereo pairs of synthetic images and the two or more pairs of real images. A six-axis DoF pose can be determined based on minimizing x, y, and z translations and roll, pitch, and yaw rotations for each of the two or more pairs of synthetic images and the two or more pairs of real images.

The computer can be further programmed to determine pose loss by comparing the six-axis DoF for the two or more pairs of synthetic images and the six-axis DoF for the two or more real images. The GAN can be trained based on a loss functions that input ground truth based on three-dimensional pose loss determined for two or more pairs of synthetic stereo images, wherein three-dimensional pose loss is determined by comparing stereo reconstructions of the two or more pairs of synthetic stereo images. Training the GAN can be based on the loss function provides temporal consistency in the real images. The deep neural network can be trained to identify and locate objects in a sequence of video images including one or more of vehicles, pedestrians and roadways. The deep neural network can be trained based on ground truth determined by a scene description input to a synthetic rendering engine. A sequence of video images acquired by a video sensor can be processed to identify and locate one or more of vehicles, pedestrians, and roadways using a deep neural network. The vehicle can be operated by determining a vehicle path to locate the vehicle with respect to the roadway and avoid one or more of vehicle and pedestrians. The vehicle can be operated by controlling one or more of vehicle powertrain, vehicle steering, and vehicle brakes.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®)) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
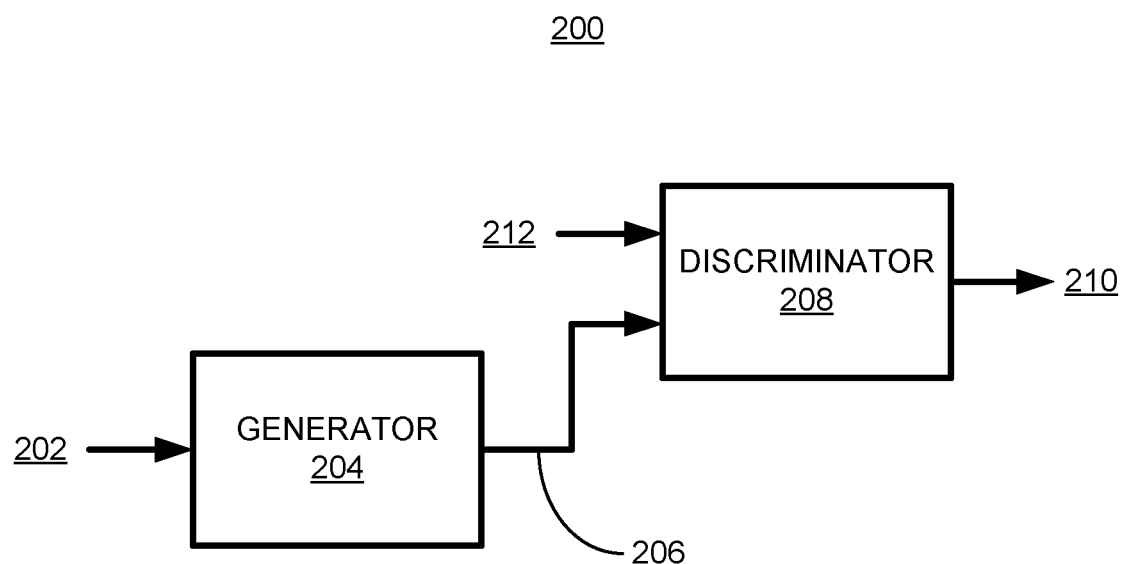
FIG. 2 is a diagram of an example generative adversarial network.

FIG. 2 is a diagram of a generative adversarial network (GAN) 200. GAN 200 can be used to modify synthetic video images to make them appear more realistic. GAN 200 includes a generator 204 that generates an output image 206 by convolving an input synthetic image 202 with convolution parameters learned at training time. The output image 206 is input to a discriminator 208 that determines whether the output image 206 is real or fake. The discriminator 208 outputs the output image 206 along with a label 210. The terms real or fake are labels 210 applied to the output image 206 by the discriminator 208. A "real" label 210 is applied to an output image 206 that would likely be judged by a human observer to have been generated by a real world camera viewing a real world scene, although it was actually generated by a synthetic image rendering engine. A "fake" label 210 is applied to an output image 206 that would likely be judged by a human observer to have been generated by a synthetic image generator, as it actually was generated. The training images 212 are video images acquired by video sensors viewing real world scenes that include real world objects such as roadways and vehicles that can be input to the discriminator 208 at training time. GAN 200 is trained to output photorealistic output images 206 with real labels 210 by back propagating real or fake labels 210 to generator 204 in response to synthetic images 202 input at training time.

GAN 200 can be configured to produce photorealistic real images 210 from synthetic images 202 by arranging GAN 200 as a cycle-consistent GAN 200. A cycle-consistent GAN 200 is configured to transform a synthetic image 202 into a real image 210 and then transform a real image 210 back into a second synthetic image 202 using a second GAN. A loss function to be used to train the GAN 200 is determined by comparing the input synthetic image 202 to the transformed output image 202. Training the GAN 200 to produce a transformed output image 202 that is substantially identical to the input synthetic image 202 improves the ability of the GAN 200 to output photorealistic real images 210. In this example substantially identical means that a summed difference in pixel values between the input synthetic image 202 and the transformed output image 210 is small, i.e. less than 1% of the summed pixel values of the input synthetic image 202.

Figure 3:
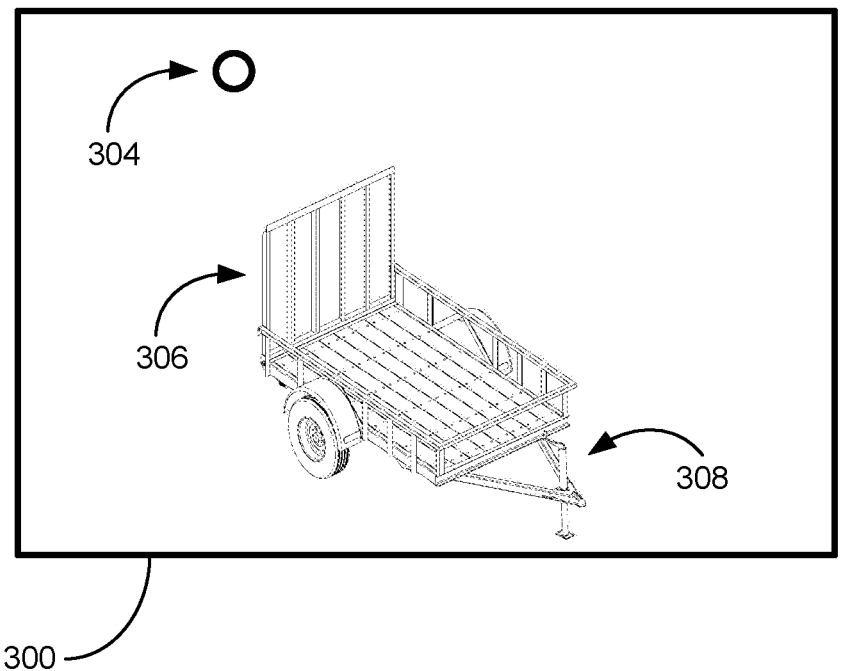
FIG. 3 is a diagram of example synthetic video images.
Figure 3:
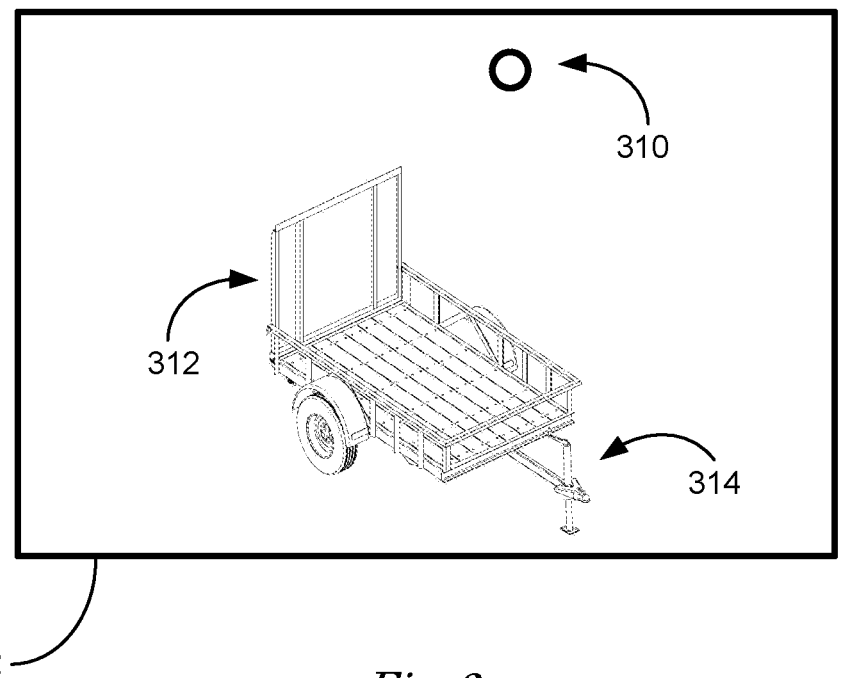

FIG. 3 is a diagram of a synthetic image 300 and a real image 302, rendered as black and white line drawings to comply with Patent Office regulations. Real image 302 can be output from a trained GAN 200 in response to inputting synthetic image 300. While the output real image 302 is photorealistic as defined above, GAN 200 can change details in the real image 302. For example, the position of the sun 304 in synthetic image 300 is changed to position 310 in real image 302. The number of bars in the trailer gate 306 in synthetic image 300 is changed from six to four bars 312 in real image 302. The trailer hitch is changed from "A" frame 308 in synthetic image 300 to straight bar 314 in real image 302. These types of changes, while small, can cause confusion when the real image 302 is used to train a deep neural network (DNN) to recognize objects in real world video images acquired by vehicle sensors while a vehicle is operating on a roadway. Making photorealistic images used to train a DNN as similar as possible to real world images acquired by vehicle sensors can improve the operation of DNNs used to operate vehicles.

Variations in a real image 302 as compared to a synthetic image 300 can be a result of temporal inconsistency, which is defined as variations in a series of real images 302 produced by a GAN 200 from a series of synthetic images 300 that correspond to a time sequence of synthetic images 300. A time sequence of synthetic images 300 can correspond to a series of synthetic images 300 that simulate successive images acquired by a vehicle sensor as it travels on a roadway, for example. Training a GAN 200 to avoid temporal inconsistencies can prevent random variations from being introduced into a series of real images 302 by training the GAN 200 using two or more stereo pairs of synthetic images 300 and two or more pairs of real images 302. Techniques described herein can improve the ability of a GAN 200 to output photorealistic real images 210 by adding a stereo visual odometry process as described below in relation to FIG. 4 to determine a loss function based on stereo visual odometry for training the GAN 200. Producing synthetic images 202 as stereo pairs and comparing the determined three-dimensional pose of the synthetic images 202 to a determined three-dimensional pose of real images 210 to form a loss function based on three-dimensional pose can improve the training of a GAN 220 to produce photorealistic real images 210 that avoid temporal inconsistency. In this example three-dimensional poses are generated from a temporal sequence of two or more stereo pairs of synthetic images 300 and two or more stereo pairs of real images 300 and the three-dimensional poses are compared to form the loss function. By comparing the three-dimensional poses, a comparison is made that includes geometric features of both the synthetic images and real images. Geometric features are defined as regions of a pair of stereo images that can be detected by a stereo visual odometry process as described below in relation to FIG. 4 that yield a location in three-dimensional space.

Figure 4:
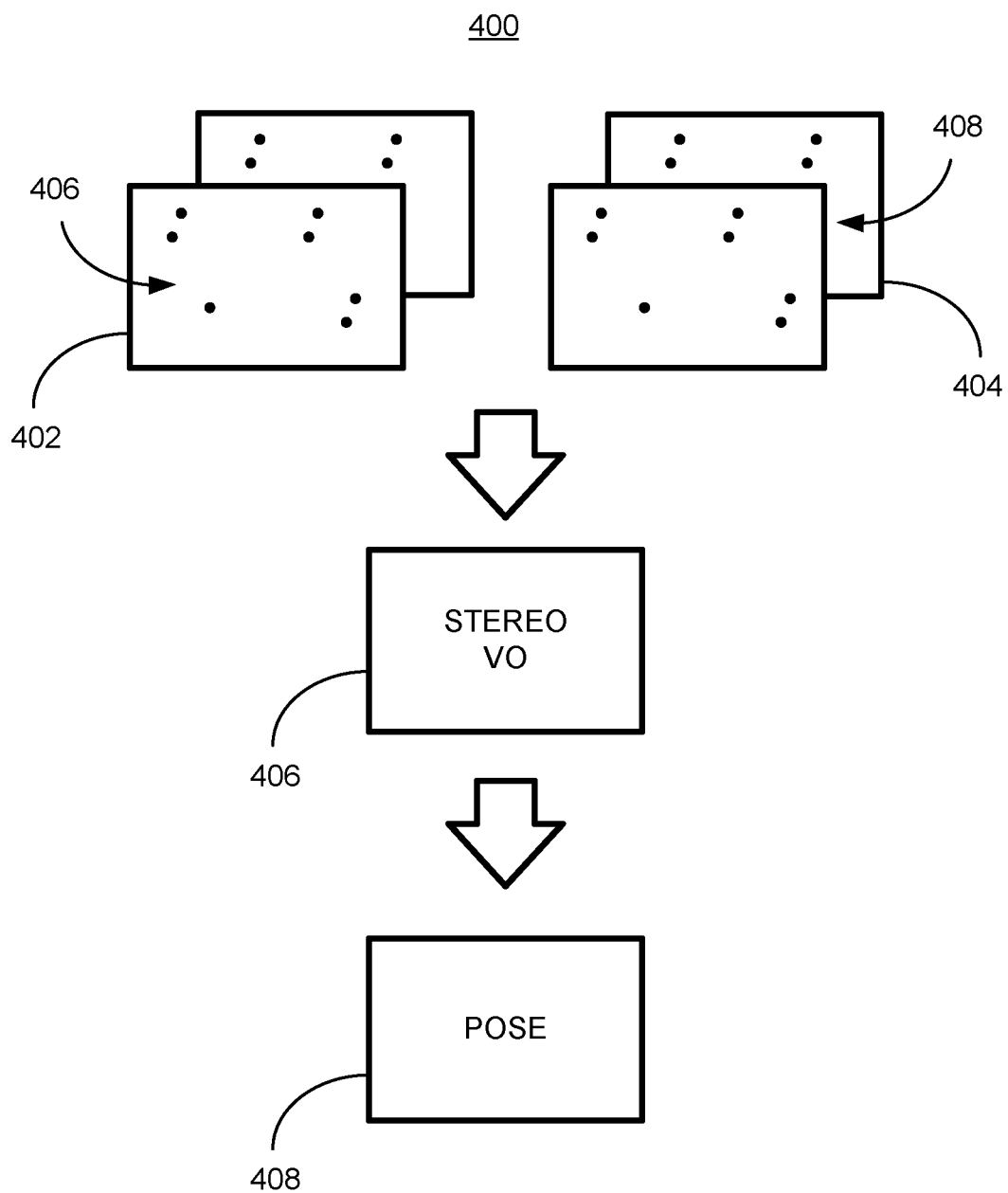
FIG. 4 is a diagram of example stereo reconstruction.

FIG. 4 is a diagram of an architecture for performing stereo visual odometry 400. Stereo visual odometry 400 is a technique for analyzing two or more pairs of stereo images 403, 404 to determine a pose or six-axis location and orientation for a virtual camera. Six-axis location and orientation can be measured with respect to three orthogonal coordinate axes, x, y, and z, and three rotational coordinates roll, pitch, and yaw, measured with respect to the three coordinate axes, respectively. A synthetic rendering engine can be programmed to produce pairs of stereo images 402, 404 for scenes rendered by the synthetic rendering engine. Each pair of stereo images corresponds to a view of a simulated scene acquired as a pair of virtual cameras move in the simulated scene. The pairs of stereo images 402, 404 can be input to a stereo visual odometry process (STEREO VO) 406 to determine a three-dimensional (3D) pose for the virtual cameras. Stereo visual odometry process 406 is a software program that inputs pairs of stereo images by determining points 406, 408 corresponding to geometric features that are common to each image in a pair of stereo images and calculates the differences in locations of each pair of corresponding points. The differences in locations of points 406, 408 in a pair of stereo images 402, 404 can be used to determine 3D locations of points in the synthetic scene rendered by the synthetic rendering engine. Differences in locations of points 406, 408 between two or more pairs of stereo images 402, 404 acquired at a given time step can be analyzed using a stereo visual odometry process 406 to yield the odometry or 3D motion of a virtual camera (POSE) 408. More than two pairs of stereo images 402, 404 can be input to a stereo visual odometry process 406 as long as the time step between each pair of stereo images 402, 404 is known.

The visual odometry process 406 determines a six-axis pose of a (virtual) camera by first determining points 406, 408 corresponding to geometric features in pairs of stereo images 402, 404 by processing each image using machine vision techniques to locate the same feature in each image. Image features can be determined by selecting regions in each image that have similar characteristics, such as edges or contrast differences. The regions can be located by performing correlations using small regions of one image as a correlation kernel to locate the similar regions in other images. When similar regions are identified, a similar location in each region, for example the center, can be used as a point 406, 408 as the location of the region. The differences in location of corresponding points $u_j$ in each of a pair of stereo images 402, 404 is referred to as stereo disparity, where the subscript j denotes which point is being referred to. Stereo disparity for the points $u_j$ can be triangulated to determine three-dimensional features $X_j$ by assuming that the stereo images 402, 404 were imaged by an image sensor having a lens with a magnification M and an optical center at a distance d from an image sensor plane. Assuming that the first pair of stereo images 402 were acquired at time $t_0$ and the second pair of stereo images 404 were acquired at time $t_1$, where the time step $t=t_1-t_0$, the six-axis pose corresponding to the image sensor can be determined by the equation:

$$\underset{R,t}{\mathrm{argmin}} = \sum_j \left\| u_j - \prod (RX_j + t) \right\|^2 \qquad (1)$$

Where R is rotational coordinates roll, pitch, and yaw and t is location coordinates x, y, and z. Equation (1) determines six-axis pose by minimizing the projection error between the points 406, 408. Pose loss (PL) is the difference between the change in six-axis pose of the virtual camera of the synthetic images between the two or more pairs of stereo images $R_s t_s$ and the change in six-axis pose $R_r, t_r$ of the virtual camera of the two or more pairs of real images and can be calculated as:

$$R_s, t_s - R_r, t_r = ((\mathrm{roll}_s - \mathrm{roll}_r), (\mathrm{pitch}_s - \mathrm{pack}_r), (\mathrm{yaw}_s - \mathrm{yaw}_r),$$
$$((x_s - x_r), (y_s - y_r), (z_s - z_r)) \qquad (2)$$

Because the six-axis poses of the two or more pairs of synthetic and real stereo images are determined based on the geometric features $X_j$ of both sets of images, the geometric, constraining the pose loss to be less than a user determined threshold forces the synthetic and real stereo images to include the similar geometric features at close to the same locations. Training the GAN 200 using a minimal pose loss in this fashion trains the GAN 200 to produce real images with similar geometric features in close to the same locations as the input synthetic images over a sequence of two or more real images.

Stereo visual odometry 400 can be used to improve the training of a GAN 200. Techniques described herein can generate two or more pairs of synthetic stereo images. The synthetic stereo images can be individually processed by a GAN 200 to produce real images 210 that can be combined after processing to form two or more pairs of real stereo images. The synthetic two or more pairs of stereo images can be processed using a stereo visual odometry process 406 to form a first camera pose. The two or more pairs of real images can then be processed to form a second camera pose. The first camera pose can be compared to the second camera pose to form a pose loss function. In this example the pose loss function will be non-zero where ever the 3D features of the pairs of real images differs from the 3D features of the pairs of synthetic stereo images. The loss function can be back propagated to the generator 204, where non-zero values indicate portions of the real images where the process of making the real images photorealistic has changed the image in such a fashion as to distort the 3D geometry of the scene that the real image 210 corresponds to. Training a GAN 200 in this fashion improves GAN 200 processing to not only produce photorealistic images, but also produce images that maintain the 3D geometry of the underlying scene.

Figure 5:
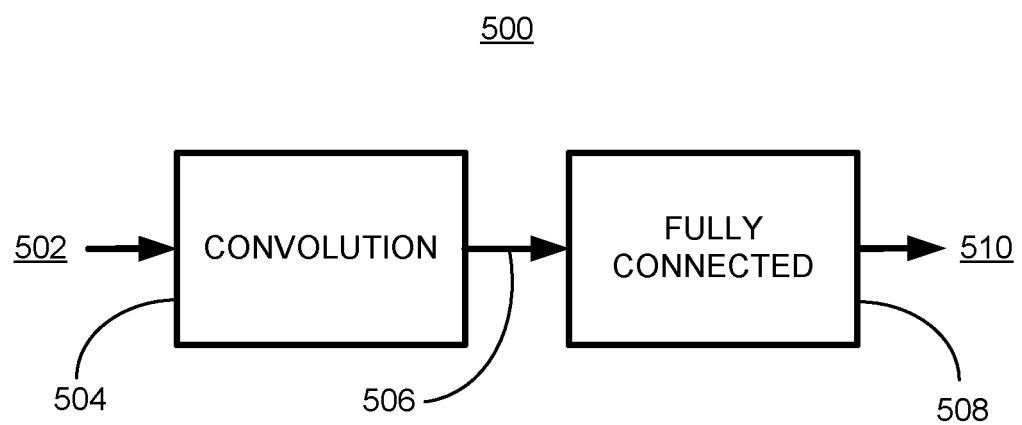
FIG. 5 is a diagram of an example deep neural network.

FIG. 5 is a diagram of a deep neural network (DNN) 500. A DNN is a software program executed on a computing device 115 that takes as input an image 502 acquired from a video sensor included in a vehicle 110. The DNN 500 processes the image 502 by first convolving the image 502 using convolutional layers (CONVOLUTION) 504 to form hidden variables 506. The hidden variables 506 are then processed by fully connected layers (FULLY CONNECTED) 508 to form output states 510. The output states include data regarding regions and objects included in the input image 502 including roadways, lane markings, other vehicles and pedestrians. A computing device 115 included in the vehicle 110 can use the output states 510 to operate the vehicle. Computing device 115 can determine a vehicle path to direct the vehicle 110 to travel in a lane determined by lane markings detected by the DNN 500 while avoiding contact with detected objects. The vehicle path can be a series of connected polynomial functions of degree three or less. The computing device 115 can operate the vehicle 110 by directing vehicle controllers 112, 113, 114 to control vehicle powertrain, steering and brakes.

The DNN 500 can be trained by inputting a plurality of real images 210 output by GAN 200 along with data obtained from the scene descriptions that the synthetic rendering engine used to generate the synthetic images 202. The scene description used by the synthetic rendering engine to generate the synthetic images 200 includes mathematical descriptions of regions and objects in the synthetic images including roadways, lane markings, and objects including other vehicles and pedestrians. The scene description can be used a ground truth to be compared to the output states 510 back propagated by the DNN 500 during training to determine whether the DNN 500 has correctly detected and identified regions and objects in the output states 510.

Figure 6:
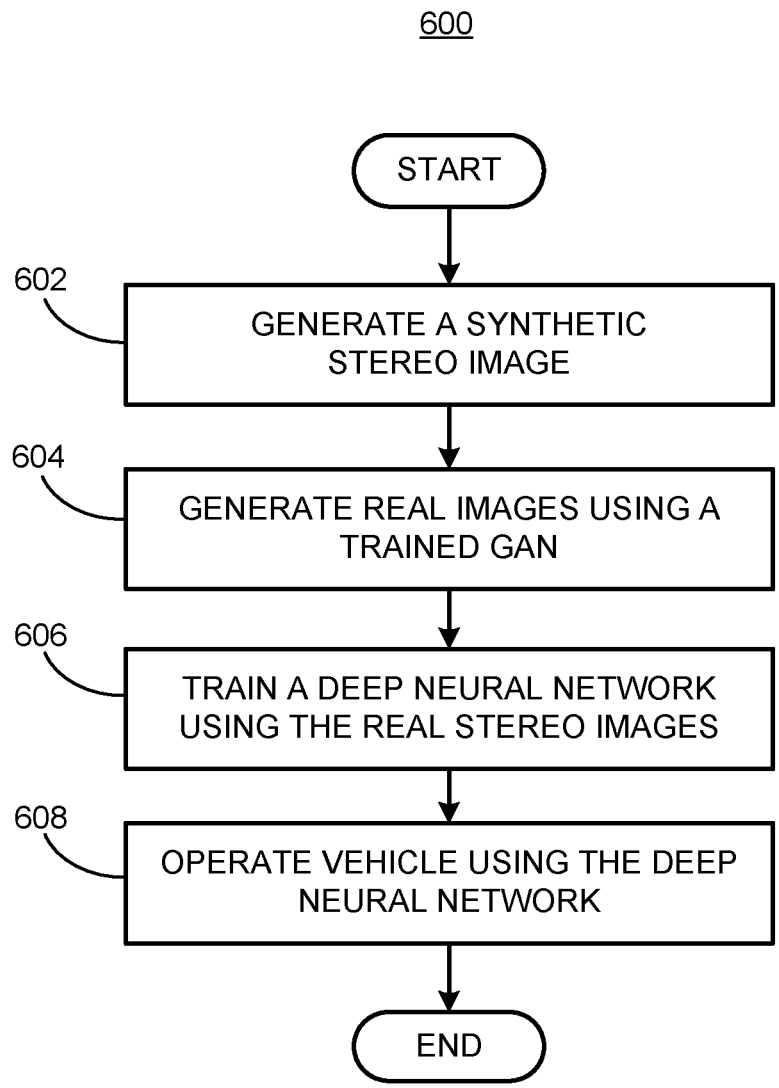
FIG. 6 is a flowchart diagram of an example process to operate a vehicle using a deep neural network.

FIG. 6 is a diagram of a flowchart, described in relation to FIGS. 1-3, of a process 600 for operating a vehicle based on output from a DNN 500. Process 600 can be implemented by a processor of computing device, taking as input information from sensors, and executing commands, and outputting object information, for example. Process 600 includes multiple blocks that can be executed in the illustrated order. Process 600 could alternatively or additionally include fewer blocks or can include the blocks executed in different orders.

Process 600 begins at block 602, a synthetic image 202 is generated by a synthetic image rendering engine as discussed above in relation to FIG. 3. The synthetic image 202 is one of a large number (>1000) of synthetic images 202 generated to simulate the conditions that a vehicle 110 can encounter when operating in the real world. Along with the synthetic images 202, the synthetic rendering engine outputs scene descriptions that include mathematical descriptions of regions and objects in the scene descriptions for training a DNN 500. The synthetic image rendering engine can produce a sequence of synthetic images 202 that correspond to a time series of images acquired from a vehicle sensor as a vehicle 110 travels on a roadway, for example.

At block 604 the synthetic image 202 is input to a GAN 200 to generate a real image 210. The GAN 200 has been trained using a large number (>1000) sets of two or more pairs of synthetic stereo images using a loss function determined by stereo visual odometry 300. Because of the training, the output real image 210 is photorealistic and faithfully renders the 3D geometry of the input synthetic image. At runtime, a single synthetic image 202 can be input to GAN 200 to generate a single real image 210. Because the GAN 200 is trained using a sequence of two or more stereo pairs of input and output images, in operation a sequence of input synthetic images 202 can be processed by GAN 200 to produce a sequence of real images 210 having temporal consistency.

At block 606 the large number (>1000) of output real images 210 and data from the scene descriptions, including sequences of real images 210 corresponding to a time series of images acquired by a vehicle sensor can be used to train a DNN 500. The trained DNN 500 can process input images 502, including sequences of input images 502, and produce output states 510, including sequences of output states 510 corresponding to regions and objects in the input images 502 including roadways, lane markers, and objects including other vehicles and pedestrians.

At block 608 the trained DNN 500 is used by a computing device 115 to operate a vehicle 110. The computing device 115 can acquire image data 502 from a video sensor included in the vehicle 110 and process the image data 502 to generate output states 510 including roadways, lane markers, and objects including other vehicles and pedestrians. The computing device 115 can use the output states 510 to determine a vehicle path and control vehicle powertrain, steering and brakes to cause vehicle 110 to operate along the vehicle path. Following block 608 process 600 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising a processor; and
a memory, the memory including instructions to be executed by the processor to:
generate two or more stereo pairs of synthetic images;
generate two or more stereo pairs of real images based on the two or more stereo pairs of synthetic images using a generative adversarial network (GAN), wherein the GAN is trained using a six-axis degree of freedom (DoF) pose determined based on the two or more pairs of real images and the two or more pairs of synthetic images by stereo visual odometry; and
train a deep neural network based on a sequence of real images.

2. The computer of claim 1, wherein the GAN is initially trained to generate stereo pairs of real images based on unpaired real and simulated images.

3. The computer of claim 1, the instructions including further instructions to generate two or more pairs of synthetic images by inputting scene descriptions into a synthetic image rendering engine.

4. The computer of claim 3, the instructions including further instructions to determine pose loss by comparing the six-axis DoF for the two or more pairs of synthetic images and the six-axis DoF for the two or more real images.

5. The computer of claim 1, the instructions including further instructions to determine pose loss by determining a change in six-axis DoF pose for the two or more stereo pairs of synthetic images and the two or more pairs of real images.

6. The computer of claim 5, the instructions including further instructions to determine a six-axis DoF pose based on minimizing x, y, and z translations and roll, pitch, and yaw rotations for each of the two or more pairs of synthetic images and the two or more pairs of real images.

7. The computer of claim 1, the instructions including further instructions to train the GAN based on loss functions that input ground truth based three-dimensional pose loss determined for two or more pairs of synthetic stereo images, wherein three-dimensional pose loss is determined by comparing stereo reconstructions of the two or more pairs of synthetic stereo images.

8. The computer of claim 1, the instructions including further instructions to train the deep neural network to identify and locate objects in a sequence of video images including one or more of vehicles, pedestrians and roadways.

9. The computer of claim 1, the instructions including further instructions to process the sequence of video images acquired by a video sensor to identify and locate one or more of vehicles, pedestrians, and roadways.

10. The computer of claim 1, the instructions including further instructions to operate thea vehicle using the deep neural network by processing a sequence of video images acquired by a vehicle sensor and controlling one or more of vehicle powertrain, vehicle brakes, and vehicle steering.

11. A method, comprising:
generating two or more stereo pairs of synthetic images;
generating two or more stereo pairs of real images based on the two or more stereo pairs of synthetic images using a generative adversarial network (GAN), wherein the GAN is trained using a six-axis degree of freedom (DoF) pose determined based on the two or more pairs of real images and the two or more pairs of synthetic images by stereo visual odometry; and
training a deep neural network based on a sequence of real images.

12. The method of claim 11, wherein the GAN is initially trained to generate stereo pairs of real images based on unpaired real and simulated images.

13. The method of claim 11, further comprising generating two or more pairs of synthetic images by inputting scene descriptions into a synthetic image rendering engine.

14. The method of claim 13, further comprising determining pose loss by comparing the six-axis DoF for the two or more pairs of synthetic images and the six-axis DoF for the two or more real images.

15. The method of claim 11, further comprising determining pose loss by determining a change in six-axis DoF pose for the two or more stereo pairs of synthetic images and the two or more pairs of real images.

16. The method of claim 15, further comprising determining a six-axis DoF pose based on minimizing x, y, and z translations and roll, pitch, and yaw rotations for each of the two or more pairs of synthetic images and the two or more pairs of real images.

17. The method of claim 11, further comprising generating two or more pairs of synthetic images by inputting scene descriptions into a synthetic image rendering engine.

18. The method of claim 11, further comprising training the GAN based on loss functions that input ground truth based three-dimensional pose loss determined for two or more pairs of synthetic stereo images, wherein three-dimensional pose loss is determined by comparing stereo reconstructions of the two or more pairs of synthetic stereo images.

19. The method of claim 11, further comprising training the deep neural network to identify and locate objects in a sequence of video images including one or more of vehicles, pedestrians and roadways.

20. The method of claim 11, further comprising operating the vehicle using the deep neural network by processing a sequence of video images acquired by a vehicle sensor and controlling one or more of vehicle powertrain, vehicle brakes, and vehicle steering.

\* \* \* \* \*

UNITED STATES PATENT AND TRADEMARK OFFICE
CERTIFICATE OF CORRECTION

PATENT NO.         : 11,138,452 B2                                          Page 1 of 1
APPLICATION NO.    : 16/595849
DATED              : October 5, 2021
INVENTOR(S)        : Punarjay Chakravarty et al.

It is certified that error appears in the above-identified patent and that said Letters Patent is hereby corrected as shown below:

In the Claims

Column 12 Claim 10, Line 17:        Change "thea" to --a--.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*